Oct. 25, 1966  R. STEFANSSON ETAL  3,281,683
ONE PIECE, ROUND, GALVANOMETER FILAMENT SUSPENSION
HAVING FLATTENED AND REDUCED DIAMETER
PORTIONS, AND METHOD OF MAKING SAME
Filed Jan. 25, 1962  2 Sheets-Sheet 1
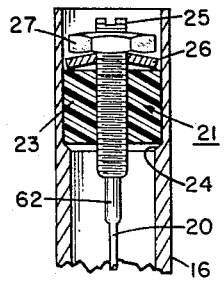
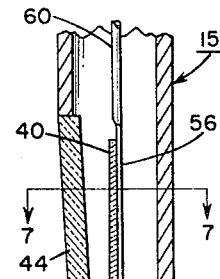
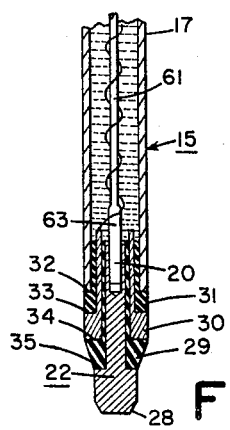
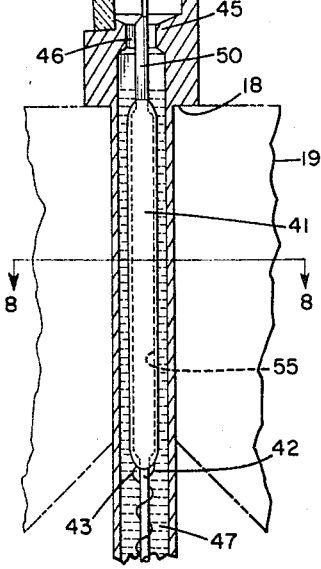
FIG.8
FIG.7
FIG.5
FIG.4
FIG.3
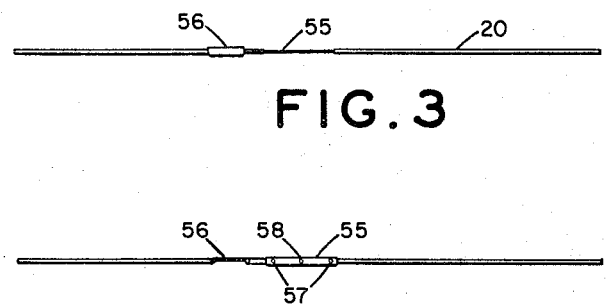
FIG.2
FIG.1
FIG.6
INVENTORS
RAFN STEFANSSON
HAROLD S. GOODRICH
BY
*Eber J. Hyde*
ATTORNEY Oct. 25, 1966  R. STEFANSSON ETAL  3,281,683
ONE PIECE, ROUND, GALVANOMETER FILAMENT SUSPENSION
HAVING FLATTENED AND REDUCED DIAMETER
PORTIONS, AND METHOD OF MAKING SAME
Filed Jan. 25, 1962  2 Sheets-Sheet 2

INVENTORS
RAFN STEFANSSON
HAROLD S. GOODRICH
BY
*Eber J. Hyde*
ATTORNEY

United States Patent Office 3,281,683
Patented Oct. 25, 1966

3,281,683
ONE PIECE, ROUND, GALVANOMETER FILAMENT SUSPENSION HAVING FLATTENED AND REDUCED DIAMETER PORTIONS, AND METHOD OF MAKING SAME
Rafn Stefansson, Sierra Madre, and Harold S. Goodrich, Pasadena, Calif., assignors to Clevite Corporation, a corporation of Ohio
Filed Jan. 25, 1962, Ser. No. 168,629
9 Claims. (Cl. 324—97)

This invention pertains to the construction of an electric galvanometer for use with a magnet.

In many prior art galvanometers the suspension system for the mirror and for the coil exerted a fairly high tensional force on the coil. During normal operation of the galvanometer this usually did not cause difficulties. However, when signals of higher amplitudes were to be recorded it required an increased electric current flow through the coil. The resistance of the coil to this increased current caused heating and in many instances softening of the insulation around the wire of the coil. This heating combined with the tensional forces applied to the coil caused rapid deterioration of the insulation and subsequent short circuiting of the coil.

An object of the present invention is to provide a galvanometer structure suitable for high frequency operation.

Another object of the invention is to provide a galvanometer construction wherein the torsional suspension means does not stress the coil which drives the suspension means.

Still another object of the invention is to provide a galvanometer construction wherein the signal coil is directly wound onto the suspension means.

Still another object of the invention is to provide a method for constructing the suspension system in a galvanometer wherein a single length of wire extends from the top to the bottom of the galvanometer and wherein the diameter of the wire is reduced at a number of portions to increase the compliance of the mount, the suspension wire between the coil and the mirror having a large diameter for close coupling of the coil to the mirror.

Another object of the invention is to provide a method for shaping a galvanometer coil which is wound directly onto a suspension means so that the suspension means and the coil may be inserted into a very small tubular housing and there will be no contact between the coil and the inner wall of the tube.

For a better understanding of the present invention, together with other and further objects thereof, reference is had to the following description taken in connection with the accompanying drawings, and its scope will be pointed out in the appended claims.

An aspect of the present invention lies in the provision of an electrical galvanometer for use with a magnet system, wherein a one-piece integral round wire suspension means is suspended in the housing. The wire has portions of a given diameter and has portions of smaller diameter to increase the compliance of the mounting system. The wire may also have a flat area to which the galvanometer mirror is secured. Coil means are wound directly onto the suspension means and a mirror is mounted on a flat portion of the wire. First and second spaced-apart connecting means connect the wire within the housing so that the coil and mirror are free of contact with the inner wall of the housing.

Another aspect of the invention lies in the method of making a one-piece torsional suspension means for a galvanometer; the method includes the steps of providing a single length of wire which is long enough to extend from the top to the bottom of the housing and the wire is of a given cross-sectional area. Material is removed from at least one section of the wire to decrease its cross-sectional area. A mirror element is directly connected to a flattened section of the wire and a coil element is directly connected to another section of the wire. The mirror and the coil are spaced from each other and the wire suspension means between the two, is of the given diameter and the wire above and below the mirror and coil has the reduced cross-sectional area to increase the compliances of the mounting system.

With reference to the drawings there is shown in FIG. 1 a length of round wire which is used in the torsional suspension system;

FIG. 2 shows the round wire after two sections thereof have been flattened to establish two mounting areas;

FIG. 3 shows the wire of FIG. 2 rotated 90°;

FIG. 4 shows in a greatly enlarged manner portions of the wire after the flat areas have been formed and after the wire has been electrically deplated to reduce its diameter at certain sections;

FIG. 5 shows the wire after a coil has wound onto it and after a mirror has been mounted on a flat area;

FIG. 6 is a tremendously enlarged view of a galvanometer utilizing the wire suspension means shown in FIG. 5;

FIG. 7 is a cross-sectional view taken along line 7—7 of FIG. 6;

FIG. 8 is a cross-sectional view taken along line 8—8 of FIG. 6;

Figure 9:
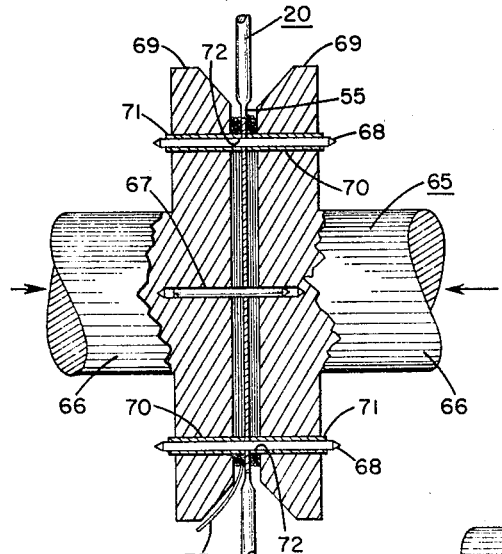
FIG. 9 is a greatly enlarged view partially broken away showing the device for winding a coil directly onto the suspension wire.

With reference to the drawing there is shown in FIG. 6 a cross-sectional view of a galvanometer constructed in accordance with the present invention. The galvanometer comprises tubular housing means 15 having a square upper section 16 of larger size than the lower round section 17, resulting in a shoulder 18 which rests on a magnet 19 when the galvanometer is assembled in its operating system. A one-piece integral round wire suspension means 20 extends from a top connecting device 21 to a bottom connecting device 22. The wire suspension means is secured in the top connector 21 by means of an insulating member 23 which is inserted in the housing 15 and rests on the shoulder 24. A threaded member 25 extends through the insulator 23 and a spring washer 26 is positioned between a nut 27 and the top insulator 23. The wire 20 is soldered within the threaded member 25. The bottom end of the wire 20 is soldered into a metallic conductive member 28. Surrounding the metal conductor 28 is an insulating tube 29 and surrounding the insulating tube 29 is a conductive metal tube 30; surrounding the conductive tube 30 is an insulating tube 31. The lower edge of the housing portion 17 abuts against a shoulder 32 on the insulating tube 31 and the insulating tube 31 rests against shoulder 33 on the conductive tube 30. The conductive tube 30 rests against a shoulder 34 on the insulating tube 29 and the insulating tube 29 rests against shoulder 35 on the metal conductor 28.

When the nut 27 is tightened the threaded member 25 is pulled up through it compressing the spring washer 26. The tensional force on the wire 20 pulls the metal conductor member 28 and the other members 29, 30, and 31 up against each other with the member 31 being in close engagement with the lower edge of the housing section 17. Thus a single nut and screw holds the entire assembly together and provides the required tension on the suspension wire 20. A mirror 40 is mounted on the wire 20 and a coil 41 is wound directly onto the wire 20. The coil 41, when the galvanometer is in place in its magnet, is between the pole pieces of the magnet 19. One end 42 of the coil is electrically connected to the suspension wire 20 and the other end 43 of coil 41 is wound about the wire 20 and is electrically connected to the conductive member 30. The metal conductor 28 and the conductive tube 30 thus serve to connect the coil 41 to an electrical circuit when the galvanometer is inserted in an operating system. Insulator tube 29 is positioned between the metal conductor 28 and the conductive tube 30 so there can be no short circuit between these two. Insulating tube 31 is located between the metal housing 15 and the conductive tube 30 thereby preventing the signal from shorting out to the housing.

A glass lens window 44 is secured in the housing 15 opposite the mirror 40 to transmit light to the mirror and away from the mirror as is known in the art. The housing 15 has a barrier or baffle 45 extending across it at a location between the coil 41 and the mirror 40. A small opening 46 permits the suspension wire 20 to pass through the baffle 45 without contact therewith. Below the baffle 45 the galvanometer is filled with a damping oil 47. The baffle serves to substantially prevent the oil 47 in the lower portion of the housing from flowing or splashing up to the upper part of the housing.

When a variable electrical signal is applied between the metal conductor 28 and the conductive tube 30 coil 41 is energized and it will rotate in the magnetic field established by the magnet 19 thus rotating the mirror 40. The wire suspension means 20 has a section 50 between the mirror and the coil which is of a given diameter sufficiently large to closely couple the coil to the mirror. Thus compliance in the wire between the coil and the mirror is kept to a minimum and the mirror moves with the coil. The suspension wire 20 where it is secured to the threaded member 25 and where it is secured to the metal conductor 28 is also of the same given relatively large diameter. However, the suspension wire 20 has a substantially reduced diameter between the mirror 40 and the top suspension member 21 and it has a substantially reduced diameter between the coil 41 and the bottom connector 22. These reduced diameter sections increase the compliance of the system and permit higher frequency operation of the galvanometer with less signal current.

Another aspect of the invention lies in the use of a single length of wire for suspending the mirror and the coil and wherein there are provided reduced diameter sections in the wire to obtain the higher compliance, and wherein flat areas are provided to which the coil 41 and the mirror 40 are mounted. In order to obtain such a suspension wire certain novel method steps are taken.

Figure 10:
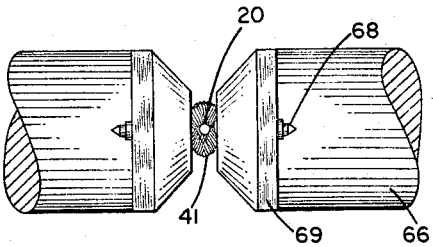
FIG. 10 is a top view looking down on FIG. 9.
Figure 12:
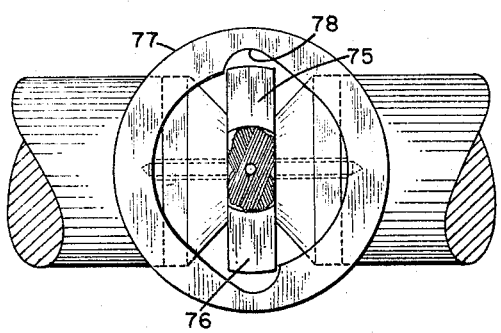
FIG. 12 is a top view showing a pair of the shaping elements in place about the coil with a cam member in place to squeeze together the shaping elements.
Figure 11:
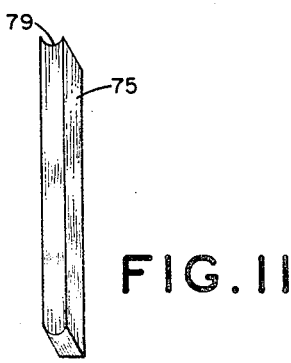
FIG. 11 is an isometric view of one of a pair of shaping members utilized to shape and dimension the coil.
Figure 13:
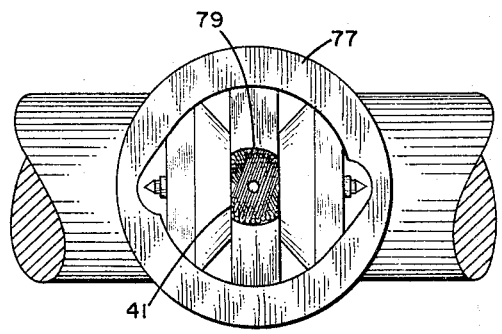
FIG. 13 is a view similar to FIG. 12 and showing the cam member rotated to squeeze the shaping elements about the coil.
Figure 14:
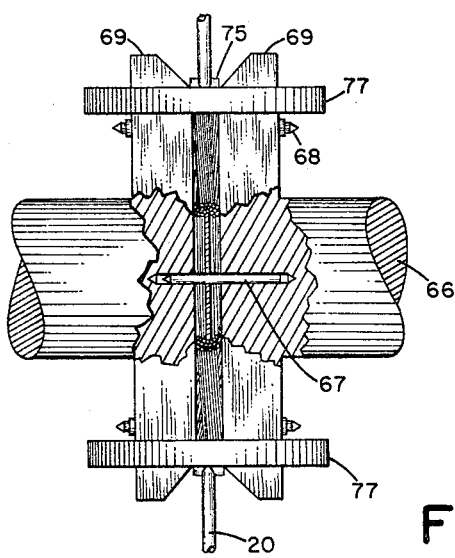
FIG. 14 is a side view showing the coil winding and shaping mechanism.

FIG. 1 shows a length of round wire. The first step in the manufacture of the suspension wire 20 is to flatten two areas of this wire 20. The first flat area 55 is to facilitate winding the coil 41 directly onto the wire 20, and the second flat area 56 is to facilitate mounting the mirror 40. The coil flat 55 has three very small holes drilled through it, two of which are identified by reference character 57, and the center hole of which is identified by reference character 58. The flat 56 which is to facilitate securing the mirror 40 is offset slightly with respect to the longitudinal axis of the suspension wire by an amount such that when the mirror 40 is mounted to the wire by adhesive or other suitable means the wire and the mirror form a system having a center of gravity or centroid which coincides with the axis of rotation of the wire alone. Thus when the mirror is driven by the coil at very high frequencies there is no force-couple established which tends to cause the wire to move out of its natural position. After the two flats 55 and 56 have been established on the wire 20 the wire is put in an electrical deplating system and it is deplated in order to establish two sections 60, 61, one near each end thereof, which are of greatly reduced cross-sectional area. Prior to the deplating step three areas of the wire 20, in addition to the two flattened areas 55, 56, are masked off so that they cannot be deplated; the three areas are the center section 50 which is between the coil flat 55 and the mirror flat 56 and the two end sections 62 and 63 which are used to secure the suspension wire in the top and bottom connectors 21 and 22. After deplating, the coil 41 is wound on the wire 20 as will be explained in connection with FIGS. 9 through 14, inclusive, and the mirror 40 is secured to the mirror flat 56 as shown in FIG. 5. The wire preferably is beryllium-copper with a given diameter .018 of an inch, and it is deplated or otherwise reduced to about .008 of an inch at sections 60 and 61.

The galvanometer of this invention is very small. The device shown in FIG. 6 is only about 2½ inches long. The outside diameter of the lower portion of the housing is less than 0.1 of an inch and the inside diameter is about .076 of an inch. Within this lower small diameter portion 17 of the housing the coil 41 is positioned. The outside diameter of the coil should not be greater than about .064 of an inch leaving .006 of an inch clearance between the coil and the wall of the housing. It is important that the coil be spaced from the wall of the housing during operation and it is also, of course, important that the cost of the galvanometer be kept to a minimum. Consequently a unique system has been devised for the production of this galvanometer which assures that close tolerances are maintained, which can be performed by ordinarily skilled persons, and which will prevent any substantial rejection of assembled devices due to over-size coils which scrape on the inner wall of the housing portion 17 as the coil rotates therein.

After the suspension wire 20 has been fully formed as has been explained in connection with FIGS. 1, 2, 3 and 4, a coil winding jig (FIG. 9) indicated generally by the reference character 65, is used for winding the coil 41 directly onto the wire 20. No space consuming coil frame or bobbin is used. The coil winding jig 65 is comprised of separate left-hand portions and right-hand portions, each mounted on a shaft 66 which is adapted to rotate. Each half of the coil winding jig has a shoulder portion 69 secured to the shaft 66. Small holes 70 extend through the shoulders 69 and in each of the holes 70 there is permanently mounted a spacing tube 71 through which the upper and lower winding pins 68 will readily slide when the halves of the jig are rotated so that the holes 70 register with each other. Each of the spacing tubes 71 extends out from the face of the shoulder 69 by a very small amount to establish a spacer portion 72. The suspension wire 20 is positioned between the two sections with the locating pin 67 extending through the center hole 58 in the coil flat 55. The locating pin 67 lies on the axis of rotation of the shafts 66. The two halves of the jig 65 can now be rotated relative to each other about the pin 67 to facilitate inserting the upper and lower winding pins 68 through the two holes 57 in the coil flat 55. This couples the two halves of the coil winding jig together so that thereafter they must rotate in unison carrying the suspension wire 20 with them. The two spacer portions 72 abut against the opposite faces of the flat 55 on the suspension wire 20 and limit the inward travel of the two halves of the coil winding jig 65 so that the coil winding jig does not engage the faces of the flat 55. This establishes and defines the space into which the wire used to form the coil 41 can be wound. Thereafter the entire jig 65 is rotated and fine wire 73 is fed in from a spool. The number of turns comprising the coil 41 is not critical but a typical way of winding the coil 41 is as follows: approximately twenty turns are taken with the wire 73 fed into the location between the left-hand side of the coil winder 65 and the wire 20; thereafter the supply of wire 73 is fed into the space between wire 20 and the right-hand side of the coil winder 65 for approximately tweny turns. Next, approximately ten turns are wound diagonally in one direction and ten turns are wound diagonally in another direction to criss-cross the first direction. Thereafter twenty turns are wound on the left-hand side and another twenty turns on the right-hand side. This method of winding the coil firmly connects the coil to the flat 55 without the use of auxiliary bobbins or frames which consume space and would prevent insertion of a coil into a tube with an extremely small internal diameter. The wire 73 which is used to form the coil 41, as is usual in the art, has a thin layer of insulation on its surface. In addition thereto it has a thin layer of adhesive over the insulation. After the coil has been wound and before it is removed from the coil fixture 65 the wire is heated slightly to a point which softens the adhesive. This can readily be done by passing a small amount of electric current through the wire utilizing its own resistance to establish the heat. Thus vary rapidly and very uniformly the entire length of the wire in the coil is brought to a uniform temperature sufficient to soften the adhesive. A coil sizing and shaping jig, comprised of two shaping elements 75, 76, are inserted between the two halves of the coil winding jig 65 and top and bottom cam members 77 are inserted over them. The cam member has a cut-away area 78 to facilitate slipping the cam members 77 over the shaping elements and over the winding jig. Thereafter the cam members 77 are rotated from the position shown in FIG. 12 to the position shown in FIG. 13. This forces the shaping elements 75, 76 inwardly against the softened coil 41. The inner faces 79 of each of the shaping elements 75, 76 are arcuate and as the shaping elements squeeze the coil 41 the maximum diameter of the coil is established and the individual turns of wire comprising the coil are forced outwardly against the faces of the shoulders 69. Thus the maximum dimension of the coil is established and the coil is shaped to fit within housing portion 17. The coil is now allowed to cool and the solidified adhesive holds it in the position and shape defined by the winding jig and by the shaping device. After the coil has cooled these members are taken away and the coil retains its configuration.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

We claim:
1 An electrical oscillograph galvanometer for use with a magnet, comprising, housing means, a one-piece integral round wire suspension means having portions of a given diameter and having portions thereof of smaller diameter than said given diameter to increase the compliance of the suspension means and having first and second closely spaced flat areas, first and second spaced apart connecting means connecting said suspension means within and to said housing means with said flat areas free of contact with said housing means, means establishing a tensional force in said wire suspension means, said portions of smaller diameter being located on opposite sides of said flat areas between said flat areas and said housing means, coil means directly wound on one of said flat areas of said suspension means and being free of said tensional force, and a mirror mounted on the other of said flat areas of said suspension means.

2. An electrical galvanometer as set forth in claim 1, further characterized by said one-piece torsional suspension means having at least one round section between its ends which differs in its cross-sectional area from the cross-sectional area of at least one other round section.

3. An electrical galvanometer as set forth in claim 1, further characterized by two round sections of said wire, one located above and the other located below said two flattened sections, being of smaller diameter than the diameter of said round wire located between the two flattened sections.

4. An electrical galvanometer as set forth in claim 1, further characterized by the flattened section for said mirror being offset from the longitudinal axis of said wire by an amount such that the wire and the mirror thereon are essentially balanced about said longitudinal axis.

5. An electrical galvanometer as set forth in claim 3, further characterized by said two flattened sections defining planes at about 90 degrees to each other.

6. An electrical galvanometer as set forth in claim 4, further characterized by said two flattened sections defining planes at about 90 degrees to each other.

7. The method of making a one-piece torsional suspension means for use in an oscillograph galvanometer having a housing with top and bottom securing devices, which comprises the steps of: providing a single length of wire long enough to extend directly from the top to the bottom securing devices and of a given cross-sectional area, removing material from at least one section of said wire by an electro-chemical deplating action to decrease its cross-sectional area, at two spaced locations flattening two sections of said wire, affixing a mirror element directly to one flattened section of said wire, winding a coil element directly and symmetrically around the other flattened section of said wire, the wire between said mirror and said coil being of said given cross-sectional area, and connecting said wire with the mirror and coil thereon in said housing under tensional force between said top and bottom securing devices.

8. The method as set forth in claim 7, further characterized by flattening said two sections of said wire at right angles to each other to provide two flat faces to which the mirror element and the coil element may be secured.

9. The method of making a galvanometer as set forth in claim 7, further characterized by mounting said single length of wire in a winding fixture while winding said coil directly thereon, heating said coil of wire while shaping and dimensioning it while said coil of wire is still in said winding fixture, and cooling said coil of wire while it is still in said winding fixture.

References Cited by the Examiner

UNITED STATES PATENTS

| | | | |
|---|---|---|---|
| 985,420 | 2/1911 | Keller | 324—154 |
| 1,797,237 | 3/1931 | Kruse | 324—79 |
| 1,982,333 | 11/1934 | Thomander | 324—97 |
| 2,183,934 | 12/1939 | Heiland | 324—97 |
| 2,510,585 | 6/1950 | Kellogg | 324—154 |
| 2,535,065 | 12/1950 | Heiland | 324—154 X |
| 2,945,181 | 7/1960 | Claussen | 324—154 |

WALTER L. CARLSON, *Primary Examiner.*

R. V. ROLINEC, *Assistant Examiner.*